Patented Feb. 20, 1934

1,947,648

UNITED STATES PATENT OFFICE 1,947,648

PROCESS FOR THE PRODUCTION OF PURE PHENOL CRESOLS AND BENZOL-HYDROCARBONS FROM CRUDE TAR PHENOLS

Fritz Hofmann and Karl Lang, Breslau, Germany, assignors to firm Oberschlesischer Berg- und Hüttenmännischer Verein e. v., Gleiwitz, Germany No Drawing. Application July 15, 1931, Serial No. 551,050, and in Germany July 22, 1930

1 Claim. (Cl. 260—154)

The crude tars obtained from Silesian coal are rich in primary tar phenols (up to 50%). The technical employment of these crude tar phenols has not hitherto given satisfaction. It has now been found that these crude tar phenols can be transformed with a good result into pure crystal phenol and cresols and also into benzol and its homologues, if the crude tar phenols are heated under pressure with hydrogen. It has been found that the presence of catalysts is not necessary. Thus the advantage is derived that the prime material does not need to be specially previously purified, as the danger of a poisoning of the catalysts does not exist.

It is already known that higher phenols can be converted into lower phenols by hydrating under pressure in the presence of a catalyst. Further it is known to hydrate under pressure crude tar phenols in the presence of catalysts, producing hydrocarbons. As compared therewith crude phenols are according to the present method subjected to hydration under pressure, without the employment of catalysts. Dr. A. E. Dunstan has successfully subjected crude tar to hydration under pressure in the presence of catalysts. During the treatment without catalysts however the phenols are not attacked (Proceedings of the Second International Conference on Bituminous Coal, volume I, page 226 and the following).

Further it has been endeavoured to hydrate under pressure crude tar fractions with carbon monoxide, however a changing of the phenol content does not occur (Gesammelte Abhandlungen zur Kenntnis der Kohle, volume 5, 1922, pages 522–523).

Example 1

400 parts by weight of Gelsenkirchen crude tar phenols, distilled in vacuum, are charged into a rotatable bomb. This is placed under a pressure of 90 atmospheres with hydrogen and heated to 485° C. for 5½ hours, the bomb being rotated. The cooled bomb still shows 70 atmospheres gas pressure. The bomb discharge (exclusive of the water formed) amounts to 85% of the phenols charged. It consists of 60% phenols and 40% neutral oils. The phenols contain about 50% crystalline phenol carbonic acid. The remainder consists chiefly of cresols. The neutral oils distil to 95% up to 150° C. They consist of about 50% benol and 45% tuluol and xylols.

Example 2

300 parts by weight of crude tar phenols distilled in vacuum from the Pless Bergwerk Verwaltung are treated as indicated in the Example 1. The bomb discharge (excluding the water formed) amounts to 70% of the inserted phenols. It consists of 45% of phenols and 55% of neutral oils. The phenols contain about 50% crystalline phenol. The remainder consists chiefly of cresols. The neutral oils distil to 85% up to 150° C. They consist of about 40% benzol and 45% toluol and xylols.

Example 3

300 parts by weight of Borsig Werk crude tar phenols distilled in vacuum are treated as in the Example 1. The bomb discharge (exclusive of the water formed) amounts to 64% of the phenols charged. It consists of 35% of phenols and 65% of neutral oils. The phenols contain about 50% crystalline phenol. The remainder consists chiefly of cresols. The neutral oils distil to 85% up to 150° C.

We claim:—

A process for producing pure phenol and also cresols and benzol hydrocarbons from crude tar phenols consisting in heating at a temperature not exceeding 485° C. the crude tar phenols with hydrogen under pressure, without catalysts being present.

FRITZ HOFMANN.
KARL LANG.